United States Patent [19]

Abe et al.

[11] Patent Number: 5,537,394
[45] Date of Patent: Jul. 16, 1996

[54] ROUTING SYSTEM FOR COMMUNICATIONS NETWORK

[75] Inventors: Shunji Abe; Akinori Iwakawa, both of Kawasaki, Japan

[73] Assignee: Fujitsu Limited, Kanagawa, Japan

[21] Appl. No.: 298,395

[22] Filed: Aug. 30, 1994

[30] Foreign Application Priority Data

Nov. 4, 1993 [JP] Japan .................................. 5-275236

[51] Int. Cl.⁶ ....................................................... H04J 3/14
[52] U.S. Cl. ................................. 370/17; 370/54; 370/60
[58] Field of Search ............................... 370/58.1, 58.2, 370/58.3, 60, 54, 61, 94.1, 13, 17, 14, 16, 16.1; 340/825.06, 825.03, 826, 827; 395/325; 379/219, 220, 221; 364/DIG. 1, 242.92, 222.2

[56] References Cited

U.S. PATENT DOCUMENTS 5,128,926  7/1992  Perlman et al. ................... 370/94.1
5,163,042  11/1992  Ochiai .................................. 370/17
5,166,927  11/1992  Iida et al. ............................. 370/54
5,347,511  9/1994  Gun ...................................... 370/54

*Primary Examiner*—Wellington Chin
*Assistant Examiner*—Huy D. Vu

[57] ABSTRACT

A process information generating section produces a communication process information necessary for a communication process. A status predicting section receives a statistically-processed status information from another node when the status of this another node has changed, and produces a prediction information predictive of the statuses of all other nodes, excluding this local node, based on the status information. A routing control section performs control to select a communications path which minimizes a network load, based on the communication process information generated by the process information generating section and the prediction information obtained by a status predicting section.

41 Claims, 7 Drawing Sheets

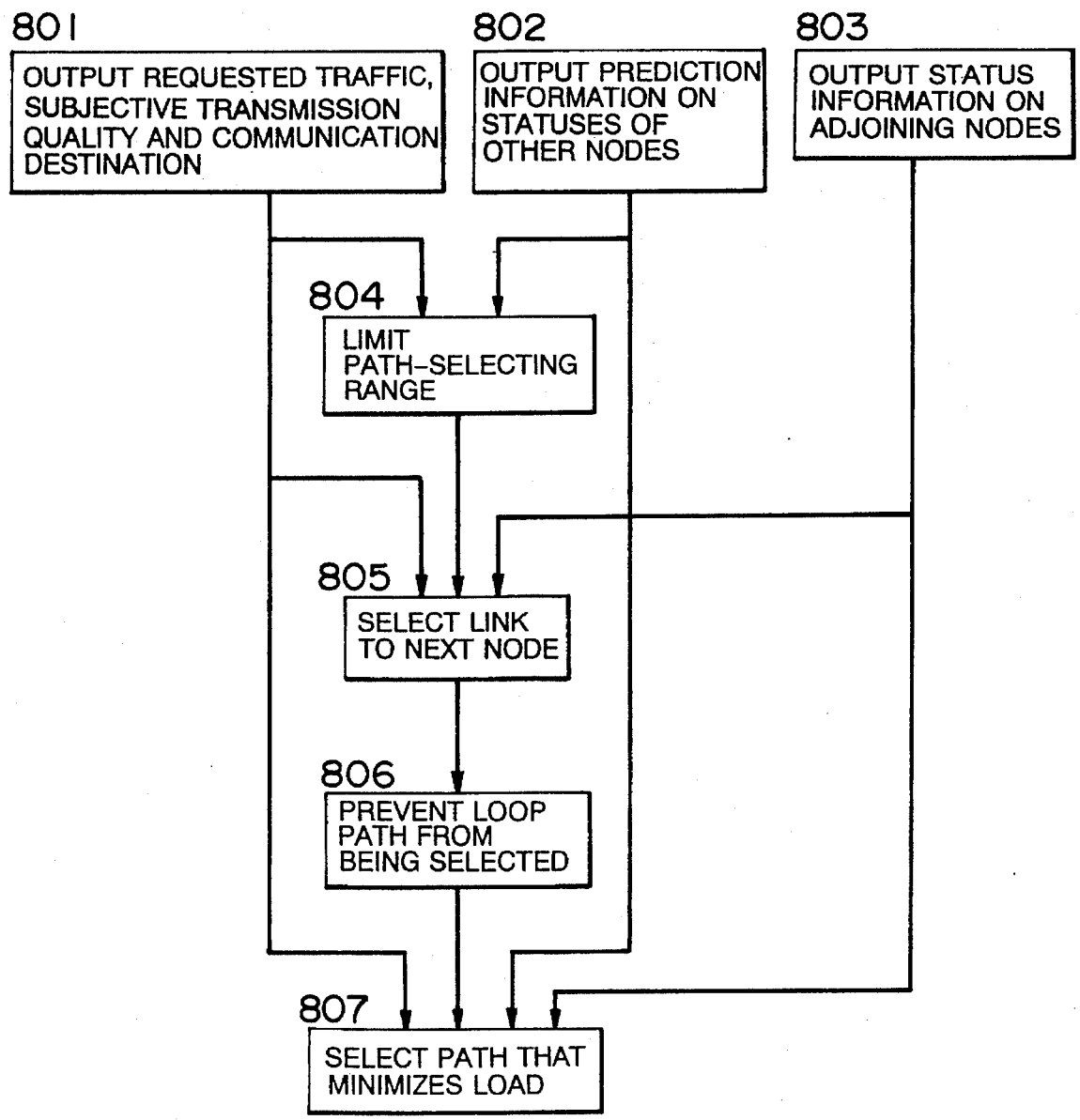

ROUTING SYSTEM FOR COMMUNICATIONS NETWORK

BACKGROUND OF THE INVENTION

1. Field of the Invention

The present invention relates to a routing system for controlling communications paths in a communications network, and, particularly, to a variance type routing system provided at each of a plurality of nodes in a communications network. More particularly, this invention relates to a routing system which efficiently execute routing even in a large-scale communications network.

2. Description of the Related Art

A communications network comprises a plurality of nodes connected by communications lines with one or more user terminals connected at each node. To communicate between any two stations or user terminals, a communications path is established via one or more nodes as relays. Normally, a communications path between any two stations is established between two nodes to which those stations are connected, and a plurality of communications paths are thus present between such two nodes. Selecting one of those communications paths is called "routing."

Generally, routing should satisfy various conditions given below.

(a) Shuttling between two stations, and looping back via a plurality of nodes should not occur.

(b) Process and control for selecting a communications path should be simple.

(c) The communications lines should be used at high efficiency.

(d) No equipments should be left invalid.

(e) Design and management of the communications network should not be complex.

(f) The load of the communications network should be minimized.

To execute routing using communications lines at high efficiency under the condition (c), it is necessary to collect status information Q, such as the load of an output link, and communication process information P like information about the traffic and subjective transmission quality, for each link request at all the nodes constituting the communications network.

The communication process information P about the traffic and subjective transmission quality can be sent from a user terminal.

But, collecting the status information Q of all the nodes burdens an excess load on the communications network and/or results in an unnecessarily longer communication process. It is not therefore easy to collect the status information Q of all the nodes. This shortcoming becomes more significant particularly as communication demands high speed and the communications network becomes larger.

SUMMARY OF THE INVENTION

It is therefore an object of the present invention to provide a routing system for a communications network, which can execute fast routing control based on self-discrimination of each node without occasionally collecting status information Q of all the nodes of the communications network and can shorten the calling time to perform the optimal routine in consideration of the entire communications network.

According to one aspect of the present invention, a routing system for a communications network having a plurality of nodes, comprises, at each node, a process information generating section, a status predicting section and a routing control section.

The process information generating section receives a link request from a user and generates communication process information P necessary for a communication process.

The status predicting section receives statistically-processed status information Q from a different node (another node) from this local node where this status predicting section is provided when the status of this another node has changed, and predicts the statuses of all other nodes, excluding this local node, based on the status information Q.

The "other nodes" mean all the nodes in the communications network, excluding the local node where the aforementioned process information generating section, status predicting section and routing control section are provided.

The status predicting section includes a status monitor section, a statistic approximation section, a statistic information transmitter/receiver, a statistic information storage section and a prediction information generating section.

The status monitor section monitors the status of the node, such as the load of an output link, for every given period.

The statistic approximation section acquires a statistic of a chronological variation distribution of the status of the node from monitor data from the status monitor section and approximates the variation distribution with a known distribution type based on the acquired statistic.

The statistic information transmitter/receiver transmits the distribution type and the statistic, respectively used and acquired by the statistic approximation section, to the other nodes when those distribution type and the statistic have changed, and receives distribution types and statistics, respectively used and acquired by the statistic approximation sections of the other nodes, both transmitted from the statistic information transmitters/receivers of the other nodes when the distribution types and statistics have changed.

The statistic information storage section stores the distribution types and statistics received from the other nodes via the statistic information transmitter/receiver.

The prediction information generating section generates prediction information R predictive of changes in the statuses of the other nodes based on the distribution types and the statistics stored in the statistic information storage section, and provides the routing control section with the prediction information R.

The routing control section selects a communications path which minimizes a load, based on communication process information P generated by the process information generating section and prediction information R predictive of the statuses of the other nodes from the status predicting section.

The statistic approximation section, the statistic information transmitter/receiver, the statistic information storage section and the prediction information generating section may designed as follows.

The statistic approximation section acquires the statistic of a chronological variation distribution of the status of the node from monitor data from the status monitor section and approximates the variation distribution with a known approximation polynomial based on the acquired statistic.

The statistic information transmitter/receiver transmits the name of the approximation polynomial and the statistic, respectively used and acquired by the statistic approximation section, to the other nodes when the statistic has changed, and receives the names of polynomials and statistics, which are respectively used and acquired by the statistic approximation sections of the other nodes and transmitted from the statistic information transmitters/receivers of the other nodes when the statistics have changed.

The statistic information storage section stores the names of the polynomials and statistics received from the other nodes via the statistic information transmitter/receiver.

The prediction information generating section generates prediction information R predictive of changes in the statuses of the other nodes based on the names of the polynomials and the statistics stored in the statistic information storage section, and provides the routing control section with the prediction information R.

Further, the statistic approximation section acquires a mean, a variance and a skewness from monitor data from the status monitor section as statistics of a distribution of a chronological change in the status of the node (e.g., a chronological change in the load of the node), and (a) approximates the distribution with either a Poisson distribution or a Gaussian distribution when the mean and the variance are equal to each other or are considered to be approximately equal to each other and when the skewness is 0 or is considered to be approximately 0, (b) approximates the distribution with either a Gaussian distribution or a hyperexponential distribution when the mean and the variance are not equal to each other and the skewness is 0 or is considered to be approximately 0, or (c) approximates the distribution with either a hyperexponential distribution or a negative binomial distribution when the mean and the variance are not equal to each other and the skewness is not 0.

The statistic approximation section may acquire a mean, a variance and a skewness the statistics of a chronological variation distribution of the status of the node from monitor data from the status monitor section and approximates the variation distribution with either a Hermite polynomial or Charlier polynomial.

According to another aspect of the present invention, a routing system for a communications network having a plurality of nodes, comprises, at each node, a process information generating section, an adjoining-node status collecting section, a status predicting section and a routing control section.

The process information generating section receives a link request from a user and generates communication process information P necessary for a communication process.

The adjoining-node status collecting section inquires the statuses of adjoining nodes which are among other nodes than the local node where this adjoining-node status collecting section is provided, and which adjoin the local node, collects the status information Q from the adjoining nodes and supplies the status information Q to the routing control section.

The "adjoining nodes" mean a plurality of predetermined nodes which are among all the nodes in the communications network, excluding the local node where the aforementioned process information generating section, adjoining-node status collecting section, status predicting section and routing control section are provided, and which are adjacent to this local node. The adjoining nodes are connected directly to an arbitrary node via communications paths without intervention of other nodes, and this arbitrary node is one of such adjoining nodes with respect to its adjoining nodes.

The status predicting section receives statistically-processed status information Q from a different node (another node) from this local node where this status predicting section is provided when the status of this another node has changed, and predicts the statuses of all other nodes, excluding this local node, based on the status information Q.

The status predicting section includes a status monitor section, a statistic approximation section, a statistic information transmitter/receiver, a statistic information storage section and a prediction information generating section.

The status monitor section monitors the status of the node, such as the load of an output link, for every given period.

The statistic approximation section acquires a statistic of a chronological variation distribution of the status of the node from monitor data from the status monitor section and approximates the variation distribution with a known distribution type based on the acquired statistic.

The statistic information transmitter/receiver transmits the distribution type and the statistic, respectively used and acquired by the statistic approximation section, to the other nodes when those distribution type and the statistic have changed, and receives distribution types and statistics, respectively used and acquired by the statistic approximation sections of the other nodes, both transmitted from the statistic information transmitters/receivers of the other nodes when the distribution types and statistics have changed.

The statistic information storage section stores the distribution types and statistics received from the other nodes via the statistic information transmitter/receiver.

The prediction information generating section generates prediction information R predictive of changes in the statuses of the other nodes based on the distribution types and the statistics stored in the statistic information storage section, and provides the routing control section with the prediction information R.

The routing control section selects a communications path which minimizes a load, based on communication process information P generated by the process information generating section, status information Q of adjoining nodes from the adjoining-node status collecting section and prediction information R predictive of the statuses of the other nodes from the status predicting section.

The statistic approximation section, the statistic information transmitter/receiver, the statistic information storage section and the prediction information generating section may be designed as follows.

The statistic approximation section acquires the statistic of a chronological variation distribution of the status of the node from monitor data from the status monitor section and approximates the variation distribution with a known approximation polynomial based on the acquired statistic.

The statistic information transmitter/receiver transmits the name of the approximation polynomial and the statistic, respectively used and acquired by the statistic approximation section, to the other nodes when the statistic acquired by the statistic approximation section has changed, and receives the names of polynomials and statistics, which are respectively used and acquired by the statistic approximation sections of the other nodes and transmitted from the statistic information transmitters/receivers of the other nodes when the statistics have changed.

The statistic information storage section stores the names of the polynomials and statistics received from the other nodes via the statistic information transmitter/receiver.

The prediction information generating section generates prediction information R predictive of changes in the statuses of the other nodes based on the names of the polynomials and the statistics stored in the statistic information storage section, and provides the routing control section with the prediction information R.

Further, the statistic approximation section acquires a mean, a variance and a skewness from monitor data from the status monitor section as statistics of a distribution of a chronological change in the status of the node (e.g., a chronological change in the load of the node), and (a) approximates the distribution with either a Poisson distribution or a Gaussian distribution when the mean and the variance are equal to each other or are considered to be approximately equal to each other and when the skewness is 0 or is considered to be approximately 0, (b) approximates the distribution with either a Gaussian distribution or a hyperexponential distribution when the mean and the variance are not equal to each other and the skewness is 0 or is considered to be approximately 0, or (c) approximates the distribution with either a hyperexponential distribution or a negative binomial distribution when the mean and the variance are not equal to each other and the skewness is not 0.

The statistic approximation section may acquire a mean, a variance and a skewness as the statistics of a chronological variation distribution of the status of the node from monitor data from the status monitor section and approximates the variation distribution with either a Hermite polynomial or Charlier polynomial.

According to a further aspect of the present invention, the adjoining-node status collecting section in the routing system for a communications network is designed as follows.

The adjoining-node status collecting section inquires the statuses of neighbor nodes which are among other nodes than the local node where this adjoining node status collecting section is provided, and which are located within a predetermined range around the local node, collects the status information Q from the neighbor nodes and supplies the status information Q to the routing control section.

The "neighbor nodes" mean a plurality of predetermined nodes which are among all the nodes in the communications network, excluding the local node where the aforementioned process information generating section, adjoining-node status collecting section, status predicting section and routing control section are provided, and which are located around this local node. The neighbor nodes are a plurality of nodes which are included in a predetermined range around an arbitrary node, and this arbitrary node should not necessarily be one of such neighbor nodes with respect to its neighbor nodes.

The routing control section selects a communications path which minimizes a load, based on communication process information P generated by the process information generating section, status information Q of neighbor nodes from the adjoining-node status collecting section and prediction information R predictive of the statuses of the other nodes from the status predicting section.

The routing control section may be constituted as described in (i) or (ii) below.

(i) The routing control section has a range limiting section and a path selecting section.

The range limiting section limits the communications-path selection range based on the communication process information P from the process information generating section and the prediction information R from the status predicting section.

The path selecting section selects a communications path which minimizes a load within the communications-path selection range, based on communication process information P generated by the process information generating section, status information Q of adjoining nodes or neighbor nodes from the adjoining-node status collecting section, prediction information R predictive of the statuses of the other nodes from the status predicting section and the communications-path selection range specified by the range limiting section.

(ii) The routing control section has a range limiting section, a link selecting section, a loop preventing section, a range transmitter/receiver and a path selecting section.

The range limiting section limits the communications-path selection range based on the communication process information P from the process information generating section and the prediction information R from the status predicting section.

The link selecting section selects a link to a next node within the communications-path selection range specified by the range limiting section, based on communication process information P generated by the process information generating section, the communications-path selection rankle specified by the range limiting section, status information Q of adjoining nodes or neighbor nodes from the adjoining node status collecting section, and the communications path selection range supplied from the range transmitter/receiver.

The loop preventing section excludes a loop-forming path from those paths to which the link selected by the link selecting section belongs, thereby preventing the selection of a path that becomes a loop.

The range transmitter/receiver transmits information of the communications-path selection range limited by the range limiting section, receives information of the communications-path selection range limited by the range limiting section of another node, and supplies the received information to the link selecting section.

The path selecting section selects a communications path which minimizes a load within the communications-path selection range, based on communication process information P generated by the process information generating section, status information Q of adjoining nodes or neighbor nodes from the adjoining-node status collecting section, prediction information R predictive of the statuses of the other nodes from the status predicting section and the communications-path selection range specified by the loop preventing section.

The communication process information P may include information about the requested traffic, subjective transmission quality and communication destination.

The subjective transmission quality may include at least one of a blocking probability or probability of loss, a transfer delay of a packet or cell, a wasting ratio of packets or cells.

The status information Q may include information about the load of an output link.

The aforementioned communications network includes an ATM (Asynchronous Transfer Mode) switched network, packet switched network, frame relay network and a line 25 switched network, for example.

All or some of the process information generating section, the status monitor section, the statistic approximation section and the prediction information generating section may be constituted of a CPU (Central Processing Unit) which uses, for example, a microprocessor or the like.

The statistic information storage section may be constituted of a semiconductor memory, magnetic recording device, an optical recording device, or the like.

According to the routing system for a communications network which embodies the present invention, the status predicting section provides prediction information R predictive of the statuses of remote nodes. The use of the prediction information R reduces the time for collecting status information Q for all the nodes and can thus accomplish fast routing control. That is, the routing control section selects the communications path which minimizes the load, using the communication process information P from the process information generating section and the prediction information R from the status predicting section.

If the adjoining-node status collecting section is provided so that the status information Q of the adjoining nodes is also used in routing done by the routing control section, a more appropriate communications path can be selected as compared with the case where routine is performed based only on the communication process information P and prediction information R.

The provision of the loop preventing section in the routing control section can prevent the formation of a loop that is not so desirable in routing.

BRIEF DESCRIPTION OF THE DRAWINGS

Other objects and advantages of the invention will become apparent during the following discussion in conjunction with the accompanying drawings, in which:

FIG. 9 is a flowchart for explaining the operation of the system in FIG. 8.

DETAILED DESCRIPTION OF THE PREFERRED EMBODIMENTS

First Embodiment

Figure 1:
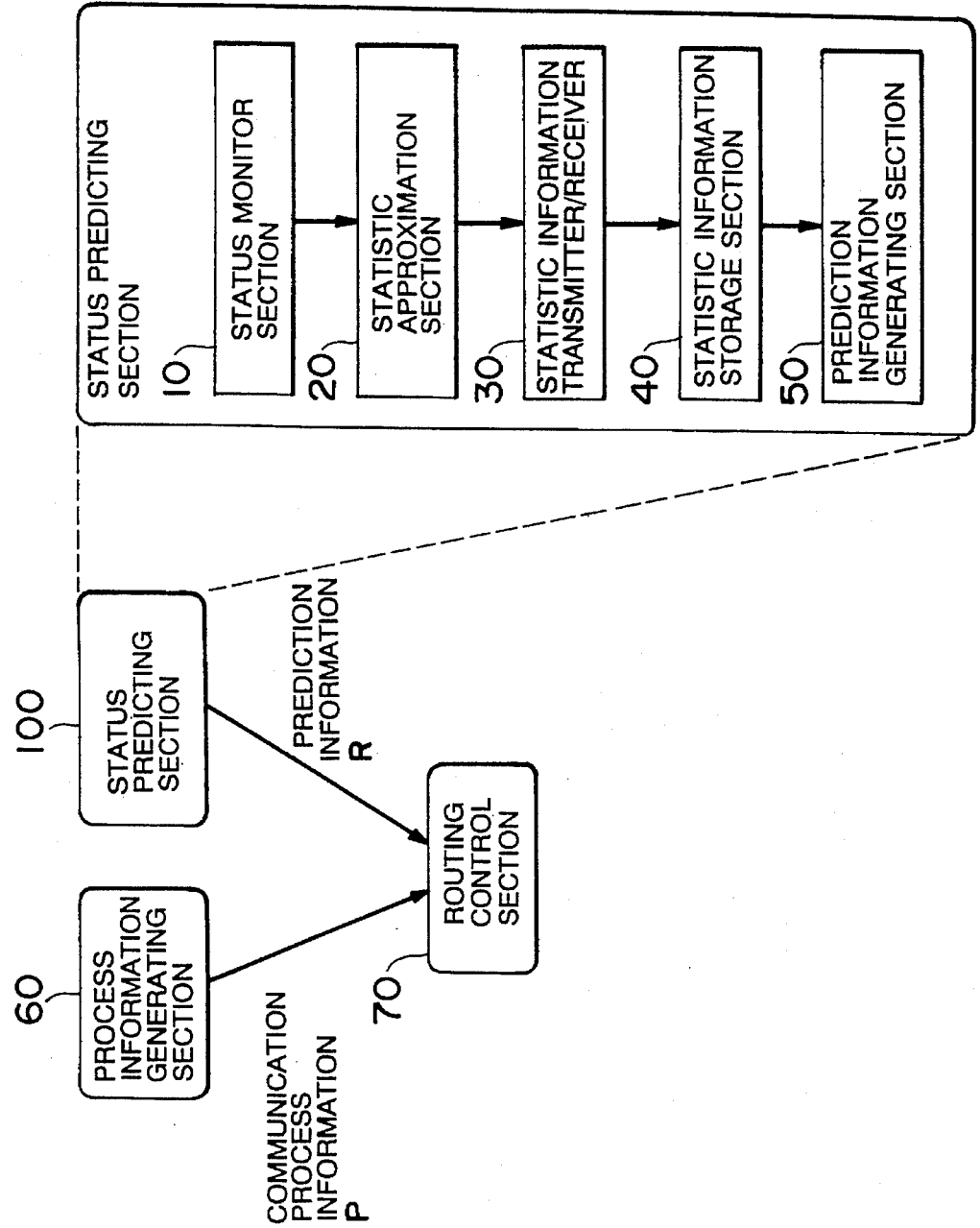
FIG. 1 is a block diagram showing the structure of a principle routing system for a communications network according to a first embodiment of the present invention.

FIG. 1 shows the structure of a routing system for a communications network according to a first embodiment of this invention.

In the routing system for a communications network having a plurality of nodes, a process information generating section 60, a status predicting section 100 and a routing control section 70 are provided at each node.

The process information generating section 60 receives a link request from a user and generates communication process information P necessary for a communication process.

The status predicting section 100 receives statistically-processed status information Q from a different node (another node) from this local node where this status predicting section 100 is provided when the status of this another node has changed, and predicts the statuses of all other nodes, excluding this local node, based on the status information Q.

The "other nodes" mean all the nodes in the communications network, excluding the local node where the aforementioned process information generating section 60, status predicting section 100 and routing control section 70 are provided. In the example shown in FIG. 3, with regard to a node N7 among nodes N1 to N20, for example, nodes N1–N6 and N8–N20 correspond to the other nodes.

The status predicting section 100 includes a status monitor section 10, a statistic approximation section 20, a statistic information transmitter/receiver 30, a statistic information storage section 40 and a prediction information generating section 50.

The status monitor section 10 monitors the status of the node, such as the load of an output link, for every given period.

The statistic approximation section 20 acquires a statistic of a chronological variation distribution of the status of the node from monitor data from the status monitor section 40 and approximates the variation distribution with a known distribution type based on the acquired statistic.

The statistic information transmitter/receiver 30 transmits the distribution type and the statistic, respectively used and acquired by the statistic approximation section 20, to the other nodes when those distribution type and the statistic have changed. The statistic information transmitter/receiver 30 receives distribution types and statistics, respectively used and acquired by the statistic approximation sections 20 of the other nodes, both transmitted from the statistic information transmitters/receivers 30 of the other nodes when the distribution types and statistics have changed.

The statistic information storage section 40 stores the distribution types and statistics received from the other nodes via the statistic information transmitter/receiver 30.

The prediction information generating section 50 generates prediction information R predictive of changes in the statuses of the other nodes based on the distribution types and the statistics stored in the statistic information storage section 40, and provides the routing control section 70 with the prediction information R.

The routing control section 70 selects a communications path which minimizes a load, based on communication process information P generated by the process information generating section 60 and prediction information R predictive of the statuses of the other nodes from the status predicting section 100.

In this routing system, the statistic approximation section 20 acquires a mean, a variance and a skewness from monitor data from the status monitor section 10 as statistics of a distribution of a chronological change in the status of the node (e.g., a chronological change in the load of the node), and (a) approximates the distribution with either a Poisson distribution or a Gaussian distribution when the mean and the variance are equal to each other or are considered to be approximately equal to each other and when the skewness is 0 or is considered to be approximately 0, (b) approximates the distribution with either a Gaussian distribution or a hyperexponential distribution when the mean and the variance are not equal to each other and the skewness is 0 or is considered to be approximately 0, or (c) approximates the distribution with either a hyperexponential distribution or a negative binomial distribution when the mean and the variance are not equal to each other and the skewness is not 0.

The statistic approximation section 20, the statistic information transmitter/receiver 30, the statistic information storage section 40 and prediction information generating section 50 may be designed as follows.

The statistic approximation section 20 acquires the statistic of a chronological variation distribution of the status of the node from monitor data from the status monitor section 10 and approximates the variation distribution with a known approximation polynomial based on the acquired statistic.

The statistic information transmitter/receiver 30 transmits the name of the approximation polynomial and the statistic, respectively used and acquired by the statistic approximation section 20, to the other nodes when the statistic has changed. The statistic information transmitter/receiver 30 receives the names of polynomials and statistics, which are respectively used and acquired by the statistic approximation sections 20 of the status predicting sections 100 of the other nodes and transmitted from the statistic information transmitters/receivers 30 of the other nodes when the statistics have changed.

The statistic information storage section 40 stores the names of the polynomials and statistics received from the other nodes via the statistic information transmitter/receiver 30.

The prediction information generating section 50 generates prediction information R predictive of changes in the statuses of the other nodes based on the names of the polynomials and the statistics stored in the statistic information storage section 40, and provides the routing control section 70 with the prediction information R.

In this case, the statistic approximation section 20 acquires a mean, a variance and a skewness as the statistics of a chronological variation distribution of the status of the node from, for example, monitor data from the status monitor section 10 and approximates the variation distribution with either a Hermite polynomial or Charlier polynomial.

The communication process information P includes information about the requested traffic, subjective transmission quality and communication destination, for example. The subjective transmission quality may include at least one of a blocking probability or probability of loss, a transfer delay of a packet or cell, and a wasting ratio of packets or cells.

The status information Q may be information about the load of an output link.

The target communications network may be any one of an ATM (Asynchronous Transfer Mode) switched network, packet switched network, frame relay network and a line switched network.

All or some of the process information generating section 60, the status monitor section 10, the statistic approximation section 20 and the prediction information generating section 50 may be constituted of a CPU which uses, for example, a microprocessor or the like. The statistic information storage section 40 may be constituted of a semiconductor memory, magnetic recording device, an optical recording device, or the like.

According to this routing system, the status predicting section 100 provides prediction information R predictive of the statuses of remote nodes. This eliminates the need for collecting the status information Q for each of the entire nodes, reduces the time for collecting status information Q for all the nodes and can thus accomplish fast routing control. That is, the routing control section 70 selects the communications path which minimizes the load, using the communication process information P from the process information generating section 60 and the prediction information R from the status predicting section 100.

Second Embodiment

Figure 2:
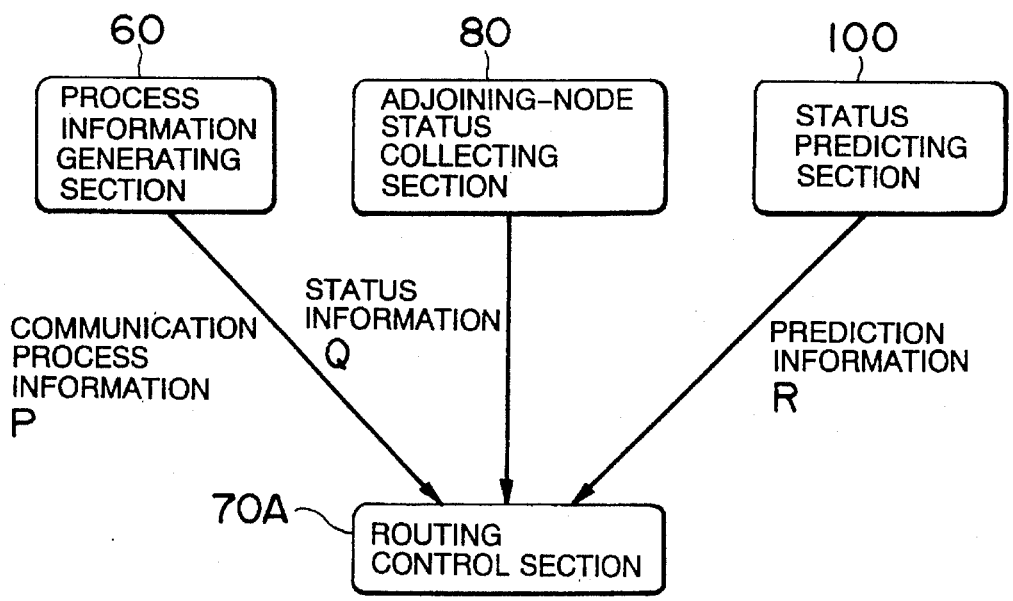
FIG. 2 is a block diagram showing the structure of a routing system for a communications network according to a second embodiment of this invention.

FIG. 2 shows the structure of a routing system for a communications network according to a second embodiment of this invention.

In the routing system shown in FIG. 2, each node is provided with a process information generating section 60, an adjoining-node status collecting section 80, a status predicting section 100 and a routing control section 70A. In other words, the system in FIG. 2 has substantially the same structure as the system in FIG. 1 with the adjoining-node status collecting section 80 provided additionally. The routing control section 70A in the system in FIG. 2 slightly differs from the routing control section 70 in the system in FIG. 1 as will be discussed later.

The process information generating section 60 receives a link request from a user and generates communication process information P necessary for a communication process.

The adjoining-node status collecting section 80 inquires the statuses of adjoining nodes which are among other nodes than the local node where this adjoining node status collecting section 80 is provided, and which adjoin the local node, collects the status information Q from the adjoining nodes and supplies the status information Q to the routing control section 70A.

The "adjoining nodes" mean a plurality of predetermined nodes which are among all the nodes in the communications network, excluding the local node where the aforementioned process information generating section 60, adjoining-node status collecting section 80, status predicting section 100 and routing control section 70A are provided, and which are adjacent to this local node. The adjoining nodes are connected directly to an arbitrary node via communications paths without intervention of other nodes, and this arbitrary node is one of such adjoining nodes with respect to its adjoining nodes. In the example shown in FIG. 3, with regard to a node N7 among nodes N1 to N20, for example, nodes N3, N4, N8, N9 and N10 correspond to the adjoining nodes.

The status predicting section 100 receives statistically-processed status information Q from a different node (another node) from this local node where this status predicting section 100 is provided when the status of this another node has changed, and predicts the statuses of all other nodes, excluding this local node, based on the status information Q.

The prediction information generating section 50 of the status predicting section 100 generates prediction information R predictive of changes in the statuses of the other nodes based on the distribution types and the statistics stored in the statistic information storage section 40, and provides the routing control section 70A with the prediction information R.

The routing control section 70A selects a communications path which minimizes a load, based on communication process information P generated by the process information generating section 60, status information Q of adjoining nodes from the adjoining-node status collecting section 80 and prediction information R predictive of the statuses of the other nodes from the status predicting section 100.

Further, the adjoining-node status collecting section 80 may inquire the statuses of neighbor nodes which are among other nodes than the local node where this adjoining-node status collecting section 80 is provided, and which are located within a predetermined range around the local node, may collect the status information Q from the neighbor nodes and may supply the status information Q to the routing control section 70A.

The "neighbor nodes" mean a plurality of predetermined nodes which are among all the nodes in the communications network, excluding the local node where the aforementioned process information generating section 60, adjoining-node status collecting section 80, status predicting section 100 and routing control section 70A are provided, and which are located around this local node. The neighbor nodes are a plurality of nodes which are included in a predetermined range around an arbitrary node, and this arbitrary node should not necessarily be one of such neighbor nodes with respect to its neighbor nodes. In the example shown in FIG. 3, with regard to the node N7 among the nodes N1 to N20, for example, the nodes N3 to N6 and N8 to N12 correspond to the neighbor nodes.

In this case, the routing control section 70A selects a communications path which minimizes a load, based on communication process information P generated by the process information generating section 60, status information Q of neighbor nodes from the adjoining-node status collecting section 80 and prediction information R predictive of the statuses of the other nodes from the status predicting section 100.

All or part of the adjoining-node status collecting section 80 may be constituted of a CPU that uses, for example, a microprocessor or the like.

In this routing system, the adjoining-node status collecting section 80 is provided so that the status information Q of the adjoining nodes or neighbor nodes is also used in the routing control executed by the routing control section 70A. This routing allows a more appropriate communications path to be selected than the routing which is carried out based only on the communication process information P from the process information generating section 60 and the prediction information R from the status predicting section 100.

Third Embodiment

Figure 3:
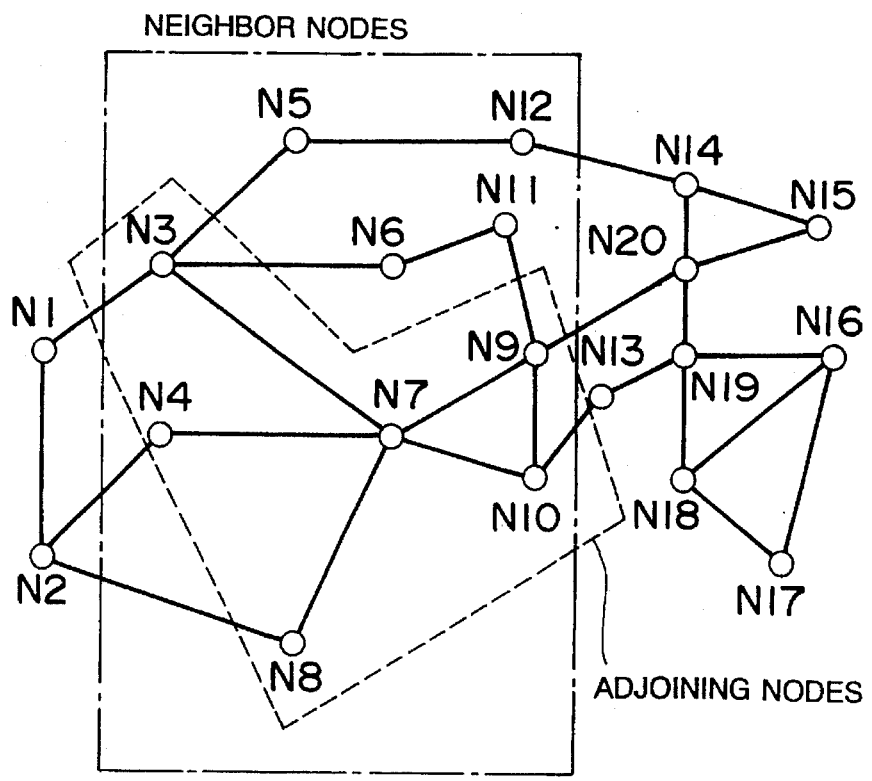
FIG. 3 is a diagram exemplarily showing the structure of a communications network for which third and fourth embodiments of this invention are adapted.
Figure 4:
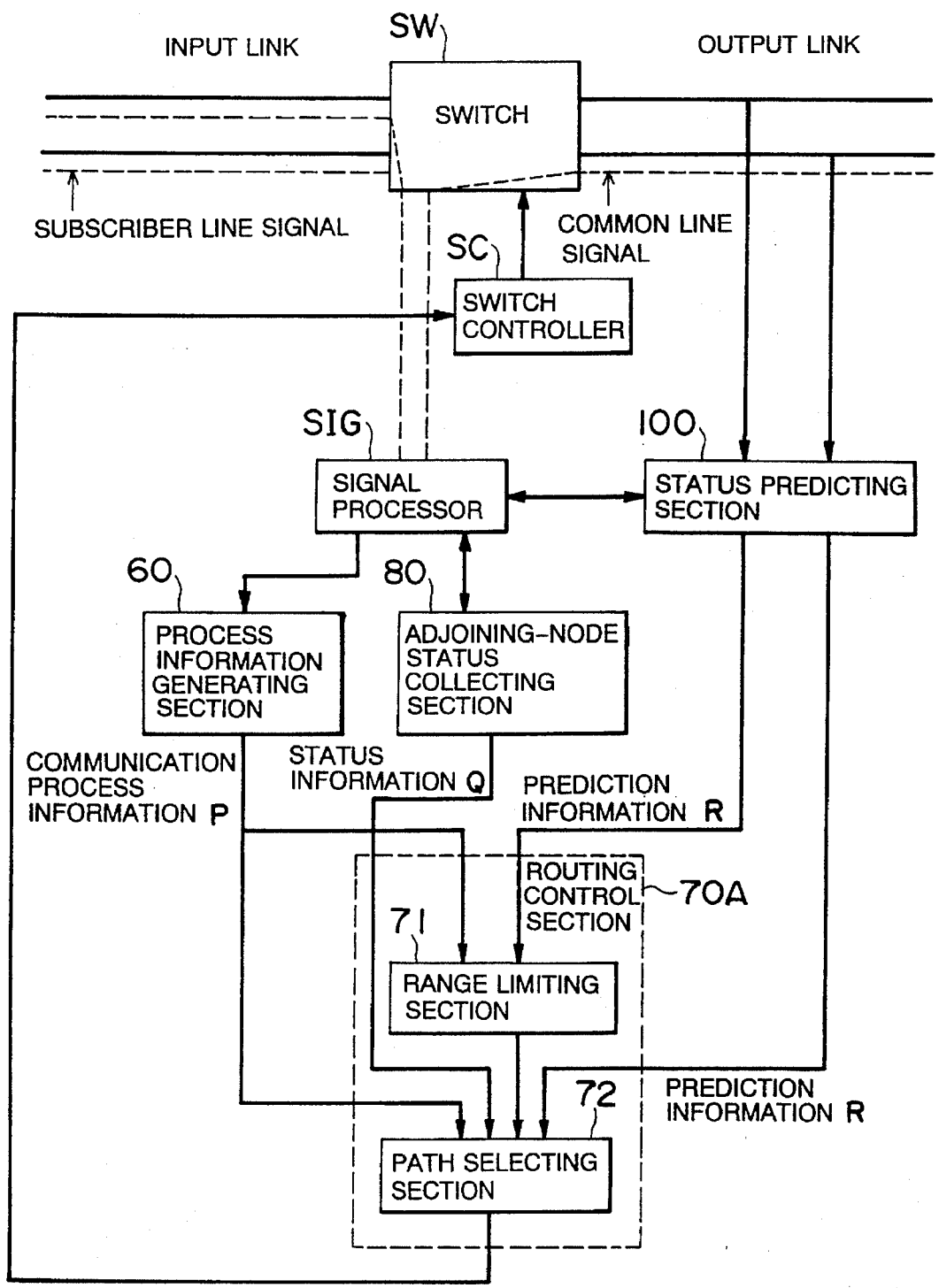
FIG. 4 is a block diagram showing the structure of a routing system for a communications network according to the third embodiment of this invention.

FIG. 3 shows the structure of one example of a communications network for which a third embodiment of this invention is adapted, and FIG. 4 shows the structure of a routing system for a communications network according to this third embodiment.

The third embodiment is the above-described second embodiment structured more specifically, and executes routing using three types of information, the communication process information P, status information Q of adjoining nodes and prediction information R of other nodes.

Outline of System

The communications network to which this embodiment is applied has a total of 20 nodes N1–N20 as shown in FIG. 3, for example of course, the number of the nodes in the communications network to which this invention is applied is not limited to "20." An ATM communications network may be used as the communications network.

FIG. 4 presents a block diagram of a node variance type routing system according to this embodiment. As shown in FIG. 4, each node is provided with a switch SW, a switch controller SC, a signal processor SIG, a process information generating section 60, an adjoining-node status collecting section 80, a status predicting section 100 and a routing control section 70A.

Switch

The switch SW selectively connects input links to output links under the control of the switch controller SC. In other words, each of the input links is connected to one of the output links by the switch SW. In FIG. 3, for example, the switch SW of the node N7 connects the input link from the node N3 to one of the output links to the nodes N4, N8, N9 and N10.

Each of the input links and output links includes a transmission line for a subscriber line signal and a transmission line for a common line signal. The transmission lines for the subscriber line signal and common line signal are connected via the switch SW to the signal processor SIG. That is, the signal processor SIG can receive and send the subscriber line signal and common line signal.

Switch Controller

The switch controller SC controls the switch SW in accordance with path selection information given from the routing control section 70A. This path selection information reflects the result of the selection of a communications path by the routing control section 70A.

Signal Processor

The signal processor SIG, which is connected to the switch SW, process information generating section 60, adjoining-node status collecting section 80 and status predicting section 100, interfaces the exchange of information signals among those elements SW, 60, 80 and 100.

Process Information Generating Section

The process information generating section 60 is connected to the signal processor SIG and the routing control section 70A. In response to a connection request from a user given via the signal processor SIG, this process information generating section 60 produces communication process information P including the requested traffic, subjective transmission quality and communication destination, and outputs this communication process information P. The subjective transmission quality includes at least one of the blocking probability or probability of loss, information on the transfer delay of a packet or cell, and the wasting ratio of packets or cells.

Adjoining-node Status Collecting Section

The adjoining-node status collecting section 30 is connected to the signal processor SIG and the routing control section 70A. This adjoining-node status collecting section 80 inquires of adjoining nodes about the statuses via the signal processor SIG and supplies the status information Q obtained from the query to the routing control section 70A. In FIG. 3, the adjoining-node status collecting section 80 of the node N7, for example, inquires of its adjoining nodes N3, N4 and N8–N10 about the statuses, and supplies the resultant status information Q to the routing control section 70A.

Status Predicting Section

The status predicting section 100, which is connected to the signal processor SIG and the routing control section 70A, predicts the statuses of other nodes, such as the load statuses of output links, and supplies prediction information R to the routing control section 70A.

The status predicting section 100 has the status monitor section 10, statistic approximation section 20, statistic information transmitter/receiver 30, statistic information storage section 40 and prediction information generating section 50, as shown in FIG. 1. In this case, the status monitor section 10, statistic approximation section 20, statistic information transmitter/receiver 30, statistic information storage section 40 and prediction information generating section 50 are constituted as follows.

The status monitor section 10 monitors the loads of the output links for every predetermined period, for example, at least one of every hour, every day, every week and every month.

The statistic approximation section 20 computes a mean, variance and skewness as the statistics of a chronological change in the node statuses from the monitor data obtained from the status monitor section 10. Then, the statistic approximation section 20 approximates the chronological distribution of a load change from those statistics in the following manner.

(a) When the mean and the variance are equal to each other or are considered to be approximately equal to each other and when the skewness is 0 or is considered to be approximately 0, the statistic approximation section 20 approximates the distribution of the load change with either a Poisson distribution or a Gaussian distribution.

(b) When the mean and the variance are not equal to each other and the skewness is 0 or is considered to be approximately 0, the statistic approximation section 20 approximates the distribution of the load change with either a Gaussian distribution or a hyperexponential distribution (c) When the mean and the variance are not equal to each other and the skewness is not 0 the statistic approximation section 20 approximates the distribution of the load change with either a hyperexponential distribution or a negative binomial distribution.

Where there are a plurality of output links, the statistic approximation section 20 acquires the correlation values among the output links as a multidimensional distribution of the mentioned distribution.

The statistic information transmitter/receiver 30 sends the distribution type and statistic to the other nodes only when the distribution type and statistic, respectively used and acquired by the statistic approximation section 20, have changed, and receives the distribution type and statistic sent from the statistic information transmitter/receiver 30 of any of the other nodes when the distribution type and statistic, respectively used and acquired by the statistic approximation section 20 at that node, have changed.

The statistic information storage section 40 stores the distribution type and statistic, received via the statistic information transmitter/receiver 30 from another node.

Based on the distribution type and statistic stored in the statistic information storage section 40, the prediction information generating section 50 predicts the statuses of the output links of the other nodes in the units of hour, day, week or month, producing prediction information R, and supplies this prediction information R to the routing control section 70A.

Routing Control Section

The routing control section 70A uses a neural network to select the communications path which minimizes the load based on the communication process information P from the process information generating section 60, the status information Q of the adjoining nodes from the adjoining-node status collecting section 80 and the prediction information R about the statuses of the other nodes sent from the status predicting section 100.

The selection of the proper communications path can be accomplished using the scheme "Routing System Using Neural Network" disclosed in Japanese Unexamined Patent Publication No. 6446/1993.

The principle of the selection of the proper communications path will now be described with reference to FIG. 5.

Figure 5:
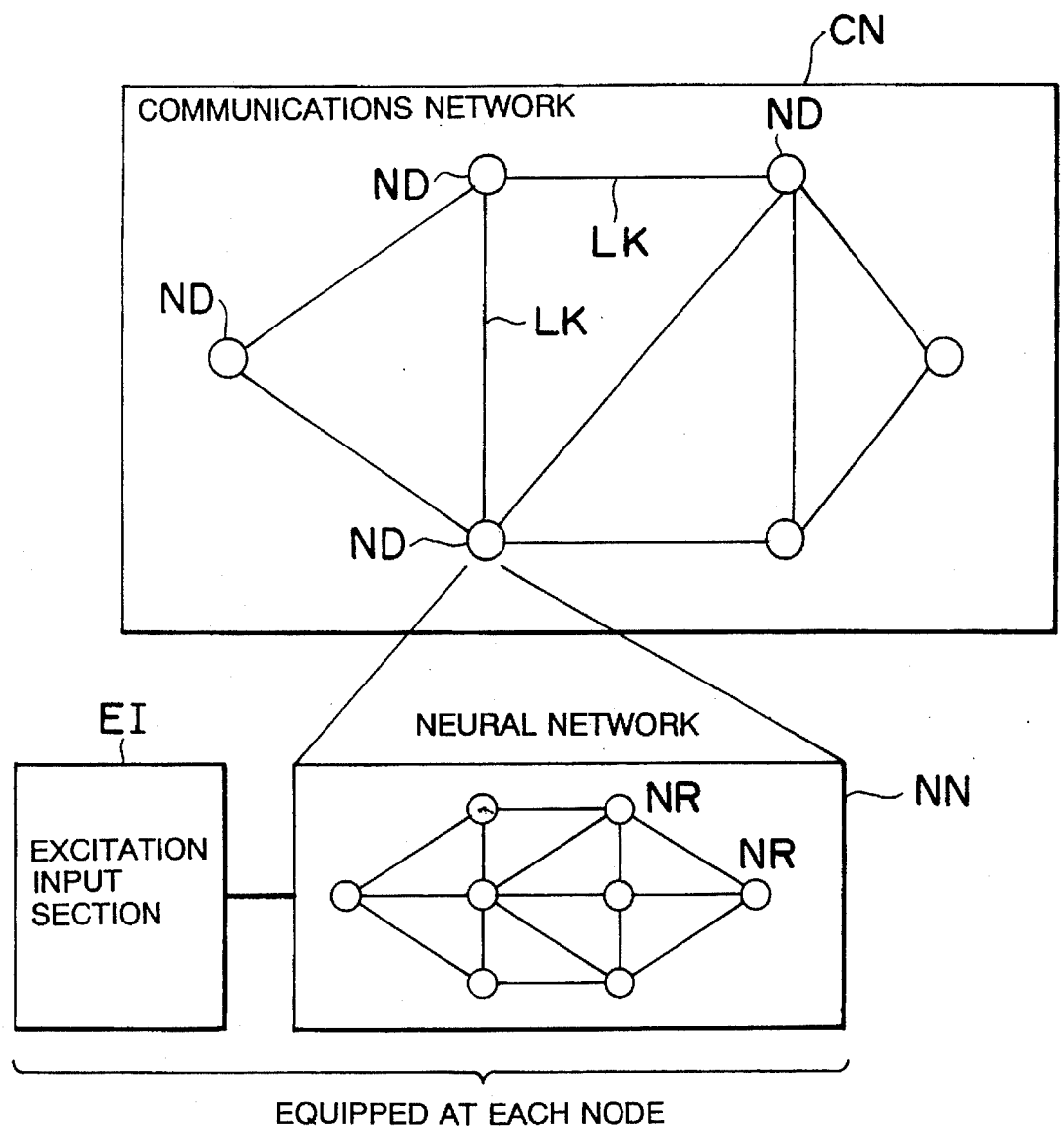
FIG. 5 is an exemplary diagram for explaining the principle of routing that is used in a neural network associated with the operation of the system shown in FIG. 4.

FIG. 5 shows a communications network CN, a neural network NN and an excitation input section EI. The neural network NN is a mutually link type neural network, and comprises two types of neurons NR, a neuron that is associated one to one with each node ND in the communications network CN (hereinafter called "node associative neuron") and a neuron that is associated one to one with each link LK in the communications network CN (hereinafter called "link associative neuron"). The excitation input section EI inputs an excitation to neurons NR which are associated one to one to the links LK.

Each neuron NR constituting the neural network NN repeats adding an input and excitation from other neurons NR and outputting the adding result as "0" or "1" through a threshold process. A node ND corresponding to the node associative neuron whose output stably becomes "1" is determined as a node ND toward which packet outputting is directed and a link LK corresponding to the link associative neuron whose output stably becomes "1" is determined as a link LK toward which packet outputting is directed.

The principle of such routing system will now be described using some equations.

The routine by this neural network employs the Hopfield operational equation.

Generally speaking, the action of each neuron in a neural network is defined by a status equation (1).

$$\left. \begin{array}{c} \dfrac{dU_i}{dt} = \sum_j T_{ij} V_j + I_i \\ V_i = G(U_i) \end{array} \right\} \quad (1)$$

where $U_i$ is the internal status of a neuron i, $V_i$ is the output status of the neuron i, $I_i$ is an excitation (external input) to the neuron i, $T_{ij}$ is a coupling coefficient for the neurons i and j, and G is a step function.

The output state $V_i$ in the action of each neuron is determined from the equation (1) in such a way that the energy function in an equation (2) below becomes minimum.

$$E = -\left(\frac{1}{2}\right) \sum_i \sum_j T_{ij} V_i V_j - \sum_i I_i V_i \qquad (2)$$

In executing a routing control using a neural network, the optimal path is selected by mapping an objective function which is minimized in the selection of a path on the energy function in the equation (2) and selecting the path based on the status of a neuron obtained from the equation (1). If a request of the traffic, transfer delay and packet (cell) wasting ratio is made by a user, for example, routing control is executed to select the path that minimizes the network load, thus ensuring a balanced network load.

To obtain the communications path that minimizes the load of the communications network using the above-described neural network, each node i and a connection link ij between nodes i–j are considered as neurons, the output status variable of the node i is set as $V_i$ and the output status variable of the connection link ij is set as $V_{ij}$. Those output status variables take a value of either "0" or "1," and any path whose output status becomes "1" is the optimal path.

$$\Phi = C_1 \sum_{i \neq d} \left( V_i - \sum_j V_{ij} \right)^2 + \qquad (3)$$

$$C_2 \sum_{i \neq s} \left( V_i - \sum_j V_{ij} \right)^2 + C_3 \sum_i \sum_j V_{ij}(V_{ij} - A_{ij}) +$$

$$C_4 \sum_i \sum_j V_{ij}(V_{ij} - B_{ij}) + C_5 \sum_i \sum_j \rho_{ij} V_{ij}$$

where $C_1$ to $C_5$ are weight coefficients, d is a receiving station, s is a calling station, $A_{ij}$ is a variable which becomes "1" when the packet (or cell) waste ratio requested by a user is satisfied and becomes "0" otherwise, $B_{ij}$ is a variable which becomes "1" when the transfer delay requested by a user is satisfied and becomes "0" otherwise, and $p_{ij}$ is a load.

On the right-hand side of the equation (3), the first and second terms are restriction conditions for selecting one path between the calling station and the receiving station, and the third and fourth terms are restriction conditions about the quality, and the fifth term is a cost function.

Then, the equation (3) and the equation (2) are mapped to obtain time variations $dU_i/dt$ and $dU_{ij}/dt$ in the internal statuses of neurons corresponding to each node and link, and the optimal path is acquired based on the stabilization of the output status given by an equation (4).

$$\left. \begin{array}{l} V_i = G\left( V_{i,t-1} + \dfrac{dU_i}{dt} \right) \\[2ex] V_{ij} = G\left( V_{ij,t-1} + \dfrac{dU_{ij}}{dt} \right) \end{array} \right\} \qquad (4)$$

The routing control section 70A shown in FIG. 4 has a range limiting section 71 and a path selecting section 72.

The range limiting section 71 limits the communications-path selecting range in the following manners (I) to (III) depending on which one of the blocking probability, packet (or cell) transfer delay and packet (or cell) waste ratio, the subjective transmission quality in the communication process information P produced by the process information generating section 60 includes.

(I) When the subjective transmission quality includes the blocking probability:

The blocking probability of the output link of each node using a variation distribution of a calling load as a load variation of the output link of each node is obtained to select the path that satisfies the requested blocking probability between the calling and receiving stations from all the paths starting from the calling station and ending at the receiving station.

(II) When the subjective transmission quality includes the packet (or cell) transfer delay:

The packet (or cell) transfer delay of the output link of each node using the packet (cell) transfer delay as a load variation of the output link of each node is obtained to select the path that satisfies the requested transfer delay between the calling and receiving stations from all the paths starting from the calling station and ending at the receiving station.

(III) When the subjective transmission quality includes the packet (or cell) waste ratio:

The packet (or cell) waste ratio of the output link of each node using the packet (or cell) waste ratio as a load variation of the output link of each node is obtained to select the path that satisfies the requested waste ratio between the calling and receiving stations from all the paths starting from the calling station and ending at the receiving station.

The path selecting section 72 selects the communications path which minimizes the load within the limited range, based on the range limiting information about the communications-path selecting range obtained by the range limiting section 71, the communication process information P generated by the process information generating section 60, the status information Q of the adjoining nodes from the adjoining-node status collecting section 80, and the prediction information R predictive of the statuses of the other nodes from the status predicting section 100, and then provides the switch controller SC with control information for selecting the path.

The operation of the routing system in FIG. 4 will be described below referring to the flowcharts in FIGS. 6 and 7.

Processing of Status Predicting Section

Figure 6:
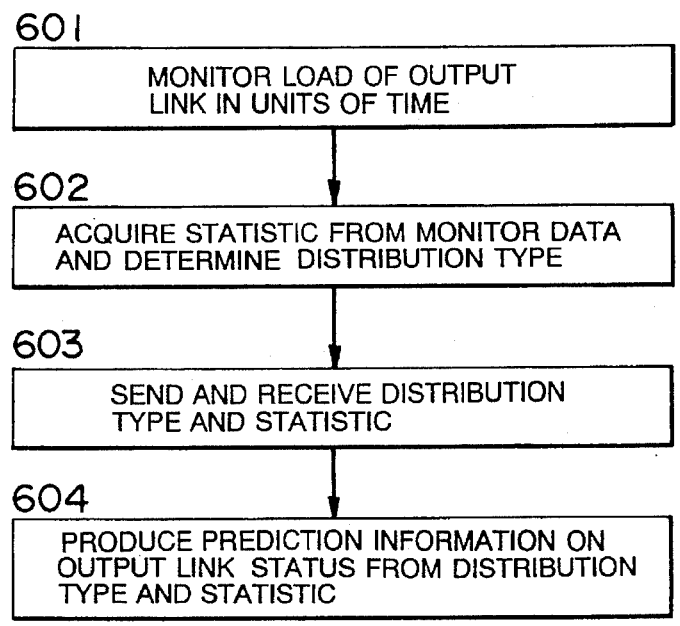
FIG. 6 is a flowchart for explaining the operation of a status predicting section in the system shown in FIG. 4.

FIG. 6 is a flowchart for explaining the processing in the status predicting section 100.

First, the status monitor section 10 monitors the loads of the output links every predetermined period (hour, day, week, month) for each calling and packet (or cell), providing the chronological distribution of a load variation (step 601).

Then, the statistic approximation section 20 calculates the statistic of the chronological distribution of a load variation from the monitor data obtained in step 601, and determines a distribution type for approximating the distribution (step 602).

When the distribution type and statistic change, the information on the distribution type and statistic are exchanged between the local node and other nodes by the statistic information transmitter/receiver 30 (step 603 ).

Further, the prediction information R on the statuses of the output links are produced based on the distribution type and statistic given from other nodes (step 604).

Processing of Routing System

Figure 7:
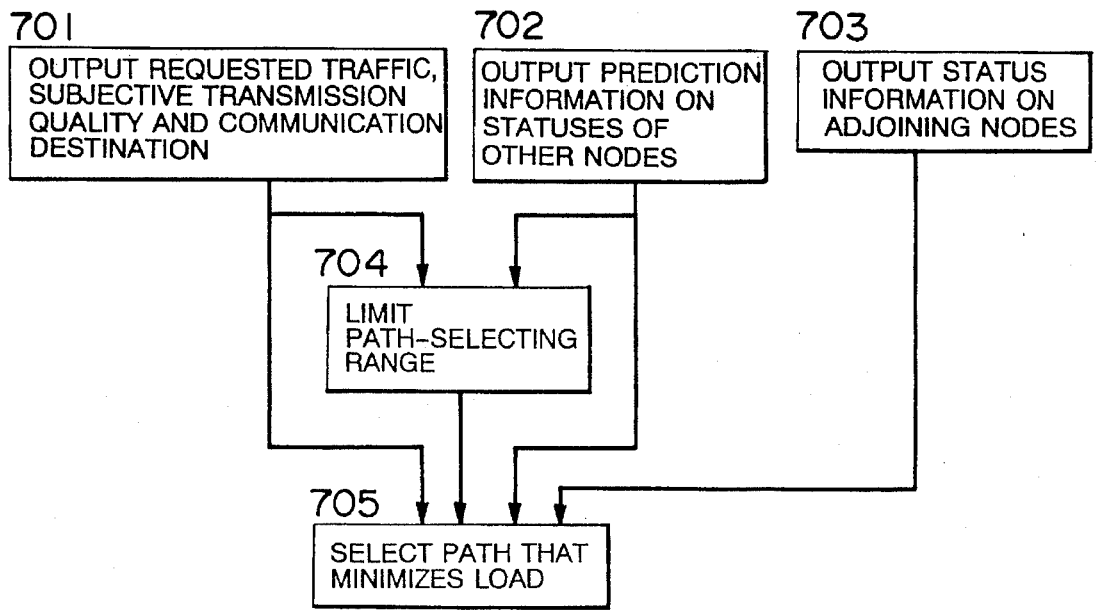
FIG. 7 is a flowchart for explaining the operation of the system in FIG. 4.

FIG. 7 shows the processing of the routing system in FIG. 4.

The process information generating section 60 outputs the communication process information P about the requested traffic, subjective transmission quality, communication destination, etc. (step 701).

The status predicting section 100 outputs the prediction information R on the statuses of other nodes (step 702).

The adjoining-node status collecting section 80 outputs the status information Q on the adjoining nodes (step 703).

Those steps 701 to 703 are independently executed.

The outputs obtained in steps 701 and 702 are given to the range limiting section 71, which in turn limits the path selecting range, and information of the limited range for the path selection is then output from the range limiting section 71 (step 704).

The outputs obtained in steps 701 to 704 are supplied to the path selecting section 72 where the path that minimizes the load is obtained, and information of this path is output from the path selecting section 72 (step 705).

In the above manner, the switch SW is controlled to execute the proper routing in accordance with the information on the path that minimizes the load, which is given to the switch controller SC from the path selecting section 72 in the routing control section 70A.

The adjoining-node status collecting section 80, as in the case in FIG. 2, may query and collect the status information of neighbor nodes within a predetermined neighbor range instead of adjoining nodes.

Fourth Embodiment

Figure 8:
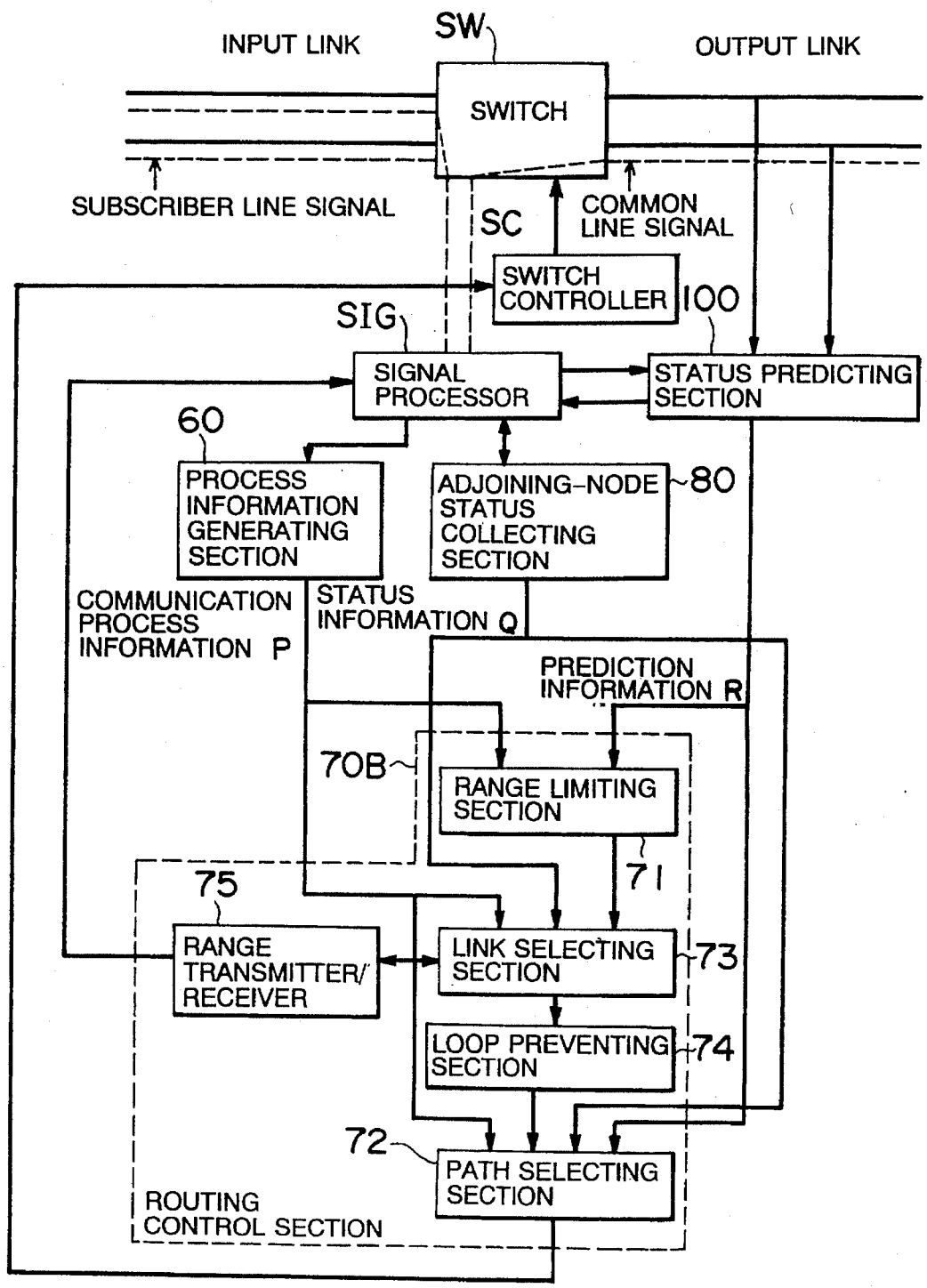
FIG. 8 is a block diagram showing the structure of a routing system for a communications network according to the fourth embodiment of this invention.

FIG. 8 illustrates the structure of a routing system for a communications network according to a fourth embodiment of this invention. In FIG. 8 like or same reference numerals as used in FIG. 4 are also given to denote corresponding or identical portions to avoid repeating their description. This embodiment uses a routing control section 70B in place of the routing control section 70A of the third embodiment.

Routing Control Section

The routing control section 70B, like the routing control section 70A in FIG. 4, selects the communications path that minimizes the load using the neural network, based on the communication process information P from the process information generating section 60 and the prediction information R predictive of the statuses of remote nodes, supplied from the status predicting section 100. This routing control section 70B has a link selecting section 73, a loop preventing section 74 and a range transmitter/receiver 75 in addition to the range limiting section 71 and the path selecting section 72 similar to those of the routing control section 70A in FIG. 4.

In this case, the range limiting section 71 supplies limiting information on the communications-path selecting range to the link selecting section 73.

The link selecting section 73 selects one or more links to the next node within the limited range, based on the limiting information obtained by the range limiting section 71, the communication process information P from the process information generating section 60 and the prediction information R predictive of the statuses of the other nodes supplied from the status predicting section 100.

The loop preventing section 74 removes the links that form a loop from among the links selected by the link selecting section 73, thereby preventing a loop path from being selected.

The range transmitter/receiver 75 sends information on the links selected by the link selecting section 73 via the signal processor SIG to the nodes to which those links are connected, and receives information on the links which are to be connected to the nodes and supplies the received information to the link selecting section 73 to select the proper link.

In this case, the path selecting section 72 selects the communications path which minimizes the load within the limited range, based on the limiting information of the links remaining after the loop preventing section 74 has removed the loop-forming links from those, selected by the link selecting section 73, the communication process information P generated by the process information generating section 60, the status information Q of the adjoining nodes from the adjoining node status collecting section 80, and the prediction information R predictive of the statuses of the other nodes from the status predicting section 100, and then provides the switch controller SC with control information for selecting the path.

Processing of Routing System

FIG. 9 shows the processing of the routing system in FIG. 8.

The process information generating section 60 outputs the communication process information P about the requested traffic, subjective transmission quality, communication destination, etc. (step 801).

The status predicting section 100 outputs the prediction information R on the statuses of other nodes (step 802).

The adjoining-node status collecting section 80 outputs the status information Q on the adjoining nodes (step 803).

Those steps 801 to 803 are independently executed.

The outputs obtained in steps 801 and 802 are supplied to the range limiting section 71, so that the range limiting section 71 limits the path selecting range, and then outputs information of the limited range for the path selection (step 804).

The outputs obtained in steps 801, 803 and 804 are given to the link selecting section 73, which in turn selects links that lead to the next node based on those information and information obtained by the range transmitter/receiver 75, and a link selecting information is then output from the link selecting section (step 805).

The loop preventing section 74 receives the link selecting information obtained in step 805 and removes the links that form a loop, based on the link selecting information, thereby preventing a loop path from being selected (step 806).

The path selecting section 72 receives outputs obtained in steps 801–803 and 806, obtains the path that minimizes the load, and outputs information of this path (step 807).

In the above manner, the switch SW is controlled to execute the proper routing in accordance with the information on the path that minimizes the load, which is given to the switch controller SC from the path selecting section 72 in the routing control section 70B.

In this case too, the adjoining-node status collecting section 80, as in the case in FIG. 2, may query and collect the status information of neighbor nodes within a predetermined neighbor range instead of adjoining nodes.

It is apparent that, in this invention, a wide range of different working modes can be formed based on the invention without deviating from the spirit and scope of the invention.

What is claimed is:

1. A routing system for a communications network having a plurality of nodes, each node comprising:

process information generating means for generating communication process information necessary for a communication process in response to a link request from a user;

status predicting means for receiving statistically-processed status information from another node when a status of said another node has changed and predicting statuses of all other nodes based on said status of said another node, said status predicting means including:

status monitor means for monitoring a status of said node for every given period, statistic approximation means for acquiring a statistic of a chronological variation distribution of said status of said node from monitor data from said status monitor means and approximating said variation distribution with a known distribution type, statistic information transmitter/receiver means for transmitting said distribution type and said statistic, respectively used and acquired by said statistic approximation means, to said other nodes, and receiving distribution types and statistics respectively used and acquired by said statistic approximation means of said other nodes, statistic information storage means for storing said distribution types and statistics received from said other nodes, and prediction information generating means for predicting changes in said statuses of said other nodes based on said distribution types and said statistics stored in said statistic information storage means and generating prediction information; and routing control means for receiving communication process information from said process information generating means and prediction information predictive of said statuses of said other nodes from said prediction information generating means and selecting a communications path which minimizes a load, based on said communication process information and said prediction information.

2. A system according to claim 1, wherein said statistic approximation means includes:

calculating means for calculating a mean, a variance and a skewness as statistics;

means for approximating said variation distribution with either a Poisson distribution or a Gaussian distribution when said mean and said variance can be considered to be equal to each other and when said skewness can be considered to be 0 based on a calculation result from said calculating means;

means for approximating said variation distribution with either a Gaussian distribution or a hyperexponential distribution when said mean and said variance are not equal to each other and said skewness can be considered to be 0 based on said calculation result from said calculating means; and means for approximating said variation distribution with either a hyperexponential distribution or a negative binomial distribution when said mean and said variance are not equal to each other and said skewness is not 0 based on said calculation result from said calculating means.

3. A system according to claim 1, wherein said communication process information includes information about a requested traffic, subjective transmission quality and communication destination.

4. A system according to claim 3, wherein said subjective transmission quality includes at least one of a blocking probability, information on a transfer delay of a packet or cell, and a wasting ratio of packets or cells.

5. A system according to claim 1, wherein said status information includes information about a load of an output link.

6. A routing system for a communications network having a plurality of nodes, each node comprising:

process information generating means for generating communication process information necessary for a communication process in response to a link request from a user;

status predicting means for receiving statistically-processed status information from another node when a status of said another node has changed and predicting statuses of all other nodes based on said status of said another node, said status predicting means including:

status monitor means for monitoring a status of said node for every given period, statistic approximation means for acquiring a statistic of a chronological variation distribution of said status of said node from monitor data from said status monitor means and approximating said variation distribution with a known approximation polynomial, statistic information transmitter/receiver means for transmitting a name of said polynomial and said statistic, respectively used and acquired by said statistic approximation means, to said other nodes, and receiving names of polynomials and statistics respectively used and acquired by statistic approximation means of said other nodes, statistic information storage means for storing said names of polynomials and statistics received from said other nodes, and prediction information generating means for predicting changes in said statuses of said other nodes based on said names of polynomials and said statistics stored in said statistic information storage means and generating prediction information; and routing control means for receiving communication process information from said process information generating means and prediction information predictive of said statuses of said other nodes from said prediction information generating means and selecting a communications path which minimizes a load, based on said communication process information and said prediction information.

7. A system according to claim 6, wherein said statistic approximation means includes:

calculating means for calculating a mean, a variance and a skewness as statistics; and means for approximating said variation distribution with either a Hermite polynomial or Charlier polynomial based on said calculation result from said calculating means.

8. A system according to claim 6, wherein said communication process information includes information about a requested traffic, subjective transmission quality and communication destination.

9. A system according to claim 8, wherein said subjective transmission quality includes at least one of a blocking probability, information on a transfer delay of a packet or cell, and a wasting ratio of packets or cells.

10. A system according to claim 6, wherein said status information includes information about a load of an output link.

11. A routing system for a communications network having a plurality of nodes, each node comprising:

process information generating means for generating communication process information necessary for a communication process in response to a link request from a user;

adjoining-node status collecting means for inquiring statuses of adjoining nodes adjacent to said node and collecting status information on said adjoining nodes resulting from that inquiry;

status predicting means for receiving statistically-processed status information from another node when a status of said another node has changed and predicting statuses of all other nodes based on said status of said another node, said status predicting means including:

status monitor means for monitoring a status of said node for every given period, statistic approximation means for acquiring a statistic of a chronological variation distribution of said status of said node from monitor data from said status monitor means and approximating said variation distribution with a known distribution type, statistic information transmitter/receiver means for transmitting said distribution type and said statistic, respectively used and acquired by said statistic approximation means, to said other nodes, and receiving distribution types and statistics respectively used and acquired by statistic approximation means of said other nodes, statistic information storage means for storing said distribution types and statistics received from said other nodes, and prediction information generating means for predicting changes in said statuses of said other nodes based on said distribution types and said statistics stored in said statistic information storage means and generating prediction information; and routing control means for receiving communication process information from said process information generating means, status information on adjoining nodes from said adjoining-node status collecting means and prediction information predictive of said statuses of said other nodes from said prediction information generating means and selecting a communications path which minimizes a load, based on said communication process information and said prediction information.

12. A system according to claim 11, wherein said statistic approximation means includes:

calculating means for calculating a mean, a variance and a skewness as statistics;

means for approximating said variation distribution with either a Poisson distribution or a Gaussian distribution when said mean and said variance can be considered to be equal to each other and when said skewness can be considered to be 0 based on a calculation result from said calculating means;

means for approximating said variation distribution with either a Gaussian distribution or a hyperexponential distribution when said mean and said variance are not equal to each other and said skewness can be considered to be 0 based on said calculation result from said calculating means; and means for approximating said variation distribution with either a hyperexponential distribution or a negative binomial distribution when said mean and said variance are not equal to each other and said skewness is not 0 based on said calculation result from said calculating means.

13. A system according to claim 11, wherein said routing control means includes:

range limiting means for limiting a communications-path selection range based on said communication process information from said process information generating means and said prediction information from said status predicting means; and path selecting means for selecting a communications path which minimizes a load, based on said communication process information generated by said process information generating means, said status information of adjoining nodes from said adjoining-node status collecting means, said prediction information predictive of said statuses of said other nodes from said status predicting means and said communications-path selection range specified by said range limiting means.

14. A system according to claim 11, wherein said routing control means includes:

range limiting means for limiting a communications-path selection range based on said communication process information from said process information generating means and said prediction information from said status predicting means;

range transmitter/receiver means for transmitting information of said communications-path selection range limited by said range limiting means, and receiving information of said communications-path selection range limited by said range limiting means of another node;

link selecting means for selecting a link to a next node based on communication process information generated by said process information generating means, said status information of said adjoining nodes from said adjoining-node status collecting means, said communications-path selection range specified by said range limiting means and said communications-path selection range obtained by said range transmitter/receiver means;

loop preventing means for excludes a loop-forming path from paths to which said link selected by said link selecting means belongs, thereby preventing said loop-forming path from being formed; and path selecting means for selecting a communications path which minimizes a load, based on said communication process information generated by said process information generating means, said status information of adjoining nodes from said adjoining-node status collecting means, said prediction information predictive of said statuses of said other nodes from said status predicting means and information on linking to a next node obtained via said loop preventing means.

15. A system according to claim 11, wherein said communication process information includes information about a requested traffic, subjective transmission quality and communication destination.

16. A system according to claim 15, wherein said subjective transmission quality includes at least one of a blocking probability, information on a transfer delay of a packet or cell, and a wasting ratio of packets or cells.

17. A system according to claim 11, wherein said status information includes information about a load of an output link.

18. A routing system for a communications network having a plurality of nodes, each node comprising:

process information generating means for generating communication process information necessary for a communication process in response to a link request from a user;

adjoining-node status collecting means for inquiring statuses of adjoining nodes adjacent to said node and collecting status information on said adjoining nodes resulting from that inquiry;

status predicting means for receiving statistically-processed status information from another node when a status of said another node has changed and predicting statuses of all other nodes based on said status of said another node, said status predicting means including:

status monitor means for monitoring a status of said node for every given period, statistic approximation means for acquiring a statistic of a chronological variation distribution of said status of said node from monitor data from said status monitor means and approximating said variation distribution with a known approximation polynomial, statistic information transmitter/receiver means for transmitting a name of said polynomial and said statistic, respectively used and acquired by said statistic approximation means, to said other nodes, and receiving names of polynomials and statistics respectively used and acquired by statistic approximation means of said other nodes, statistic information storage means for storing said names of polynomials and statistics received from said other nodes, and prediction information generating means for predicting changes in said statuses of said other nodes based on said names of polynomials and said statistics stored in said statistic information storage means and generating prediction information; and routing control means for receiving communication process information from said process information generating means, status information on said adjoining nodes from said adjoining-node status collecting means and prediction information predictive of said statuses of said other nodes from said prediction information generating means and selecting a communications path which minimizes a load, based on said communication process information and said prediction information.

19. A system according to claim 18, wherein said statistic approximation means includes:

calculating means for calculating a mean, a variance and a skewness as statistics; and means for approximating said variation distribution with either a Hermite polynomial or Charlier polynomial based on said calculation result from said calculating means.

20. A system according to claim 18, wherein said routing control means includes:

range limiting means for limiting a communications-path selection range based on said communication process information from said process information generating means and said prediction information from said status predicting means; and path selecting means for selecting a communications path which minimizes a load, based on said communication process information generated by said process information generating means, said status information of adjoining nodes from said adjoining-node status collecting means, said prediction information predictive of said statuses of said other nodes from said status predicting means and said communications-path selection range specified by said range limiting means.

21. A system according to claim 18, wherein said routing control means includes:

range limiting means for limiting a communications-path selection range based on said communication process information from said process information generating means and said prediction information from said status predicting means;

range transmitter/receiver means for transmitting information of said communications-path selection range limited by said range limiting means, and receiving information of said communications-path selection range limited by said range limiting means of another node;

link selecting means for selecting a link to a next node based on communication process information generated by said process information generating means, said status information of adjoining nodes from said adjoining-node status collecting means, said communications-path selection range specified by said range limiting means and said communications-path selection range obtained by said range transmitter/receiver means;

loop preventing means for excludes a loop-forming path from paths to which said link selected by said link selecting means belongs, thereby preventing said loop-forming path from being formed; and path selecting means for selecting a communications path which minimizes a load, based on said communication process information generated by said process information generating means, said status information of adjoining nodes from said adjoining-node status collecting means, said prediction information predictive of said statuses of said other nodes from said status predicting means and information on linking to a next node obtained via said loop preventing means.

22. A system according to claim 18, wherein said communication process information includes information about a requested traffic, subjective transmission quality and communication destination.

23. A system according to claim 22, wherein said subjective transmission quality includes at least one of a blocking probability, information on a transfer delay of a packet or cell, and a wasting ratio of packets or cells.

24. A system according to claim 18, wherein said status information includes information about a load of an output link.

25. A routing system for a communications network having a plurality of nodes, each node comprising:

process information generating means for generating communication process information necessary for a communication process in response to a link request from a user;

adjoining-node status collecting means for inquiring statuses of neighbor nodes located within a predetermined neighbor range around said node and collecting status information on said neighbor nodes resulting from that inquiry;

status predicting means for receiving statistically-processed status information from another node when a status of said another node has changed and predicting statuses of all other nodes based on said status of said another node, said status predicting means including:

status monitor means for monitoring a status of said node for every given period, statistic approximation means for acquiring a statistic of a chronological variation distribution of said status of said node from monitor data from said status monitor means and approximating said variation distribution with a known distribution type, statistic information transmitter/receiver means for transmitting said distribution type and said statistic, respectively used and acquired by said statistic approximation means, to said other nodes, and receiving distribution types and statistics respectively used and acquired by statistic approximation means of said other nodes, statistic information storage means for storing said distribution types and statistics received from said other nodes, and prediction information generating means for predicting changes in said statuses of said other nodes based on said distribution types and said statistics stored in said statistic information storage means and generating prediction information; and routing control means for receiving communication process information from said process information generating means, status information on said neighbor nodes from said adjoining-node status collecting means and prediction information predictive of said statuses of said other nodes-from said prediction information generating means and selecting a communications path which minimizes a load, based on said communication process information and said prediction information.

26. A system according to claim 25, wherein said statistic approximation means includes:

calculating means for calculating a mean, a variance and a skewness as statistics;

means for approximating said variation distribution with either a Poisson distribution or a Gaussian distribution when said mean and said variance can be considered to be equal to each other and when said skewness can be considered to be 0 based on a calculation result from said calculating means;

means for approximating said variation distribution with either a Gaussian distribution or a hyperexponential distribution when said mean and said variance are not equal to each other and said skewness can be considered to be 0 based on said calculation result from said calculating means; and means for approximating said variation distribution with either a hyperexponential distribution or a negative binomial distribution when said mean and said variance are not equal to each other and said skewness is not 0 based on said calculation result from said calculating means.

27. A system according to claim 25, wherein said routing control means includes:

range limiting means for limiting a communications-path selection range based on said communication process information from said process information generating means and said prediction information from said status predicting means; and path selecting means for selecting a communications path which minimizes a load, based on said communication process information generated by said process information generating means, said status information of neighbor nodes from said adjoining-node status collecting means, said prediction information predictive of said statuses of said other nodes from said status predicting means and said communications-path selection range specified by said range limiting means.

28. A system according to claim 25, wherein said routing control means includes:

range limiting means for limiting a communications-path selection range based on said communication process information from said process information generating means and said prediction information from said status predicting means;

range transmitter/receiver means for transmitting information of said communications-path selection range limited by said range limiting means, and receiving information of said communications-path selection range limited by said range limiting means of another node;

link selecting means for selecting a link to a next node based on communication process information generated by said process information generating means, said status information of said neighbor nodes from said adjoining-node status collecting means, said communications-path selection range specified by said range limiting means and said communications-path selection range obtained by said range transmitter/receiver means;

loop preventing means for excludes a loop-forming path from paths to which said link selected by said link selecting means belongs, thereby preventing said loop-forming path from being formed; and path selecting means for selecting a communications path which minimizes a load, based on said communication process information generated by said process information generating means, said status information of neighbor nodes from said adjoining-node status collecting means, said prediction information predictive of said statuses of said other nodes from said status predicting means and information on linking to a next node obtained via said loop preventing means.

29. A system according to claim 25, wherein said communication process information includes information about a requested traffic, subjective transmission quality and communication destination.

30. A system according to claim 29, wherein said subjective transmission quality includes at least one of a blocking probability, information on a transfer delay of a packet or cell, and a wasting ratio of packets or cells.

31. A system according to claim 25, wherein said status information includes information about a load of an output link.

32. A routing system for a communications network having a plurality of nodes, each node comprising:

process information generating means for generating communication process information necessary for a communication process in response to a link request from a user;

adjoining-node status collecting means for inquiring statuses of neighbor nodes located within a predetermined neighbor range around said node and collecting status information on said neighbor nodes resulting from that inquiry;

status predicting means for receiving statistically-processed status information from another node when a status of said another node has changed and predicting statuses of all other nodes based on said status of said another node, said status predicting means including:

status monitor means for monitoring a status of said node for every given period, statistic approximation means for acquiring a statistic of a chronological variation distribution of said status of said node from monitor data from said status monitor means and approximating said variation distribution with a known approximation polynomial, statistic information transmitter/receiver means for transmitting a name of said polynomial and said statistic, respectively used and acquired by said statistic approximation means, to said other nodes, and receiving names of polynomials and statistics respectively used and acquired by statistic approximation means of said other nodes, statistic information storage means for storing said names of polynomials and statistics received from said other nodes, and prediction information generating means for predicting changes in said statuses of said other nodes based on said names of polynomials and said statistics stored in said statistic information storage means and generating prediction information; and routing control means for receiving communication process information from said process information generating means, status information on said neighbor nodes from said adjoining-node status collecting means and prediction information predictive of said statuses of said other nodes from said prediction information generating means and selecting a communications path which minimizes a load, based on said communication process information and said prediction information.

33. A system according to claim 32, wherein said statistic approximation means includes:

calculating means for calculating a mean, a variance and a skewness as statistics; and means for approximating said variation distribution with either a Hermite polynomial or Charlier polynomial based on said calculation result from said calculating means.

34. A system according to claim 32, wherein said routing control means includes:

range limiting means for limiting a communications-path selection range based on said communication process information from said process information generating means and said prediction information from said status predicting means; and path selecting means for selecting a communications path which minimizes a load, based on said communication process information generated by said process information generating means, said status information of neighbor nodes from said adjoining-node status collecting means, said prediction information predictive of said statuses of said other nodes from said status predicting means and said communications-path selection range specified by said range limiting means.

35. A system according to claim 32, wherein said routing control means includes:

range limiting means for limiting a communications-path selection range based on said communication process information from said process information generating means and said prediction information from said status predicting means;

range transmitter/receiver means for transmitting information of said communications-path selection range limited by said range limiting means, and receiving information of said communications-path selection range limited by said range limiting means of another node;

link selecting means for selecting a link to a next node based on communication process information generated by said process information generating means, said status information of said neighbor nodes from said adjoining-node status collecting means, said communications-path selection rankle specified by said range limiting means and said communications-path selection range obtained by said range transmitter/receiver means;

loop preventing means for excludes a loop-forming path from paths to which said link selected by said link selecting means belongs, thereby preventing said loop-forming path from being formed; and path selecting means for selecting a communications path which minimizes a load, based on said communication process information generated by said process information generating means, said status information of neighbor nodes from said adjoining-node status collecting means, said prediction information predictive of said statuses of said other nodes from said status predicting means and information on linking to a next node obtained via said loop preventing means.

36. A system according to claim 32, wherein said communication process information includes information about a requested traffic, subjective transmission quality and communication destination.

37. A system according to claim 36, wherein said subjective transmission quality includes at least one of a blocking probability, information on a transfer delay of a packet or cell, and a wasting ratio of packets or cells.

38. A system according to claim 32, wherein said status information includes information about a load of an output link.

39. A routing apparatus for controlling communication paths via a plurality of nodes in a communication network, comprising:

process information generating means for generating communication process information necessary for a communication process in response to a link request from a user;

status predicting means for receiving statistically-processed status information from another node when a status of said another node has changed and predicting statuses of all other nodes based on said statistically-processed status information of said another node; and routing control means for receiving communication process information from said process information generating means and prediction information predictive of said statuses of said other nodes from said prediction information generating means and selecting a communications path which minimizes a load, based on said communication process information and said prediction information.

40. A routing apparatus for controlling communication paths via a plurality of nodes in a communication network, comprising:

process information generating means for generating communication process information necessary for a communication process in response to a link request from a user;

adjoining-node status collecting means for inquiring statuses of adjoining nodes adjacent to said node and collecting status information on said adjoining nodes resulting from the inquiry;

status predicting means for receiving statistically-processed information from another node when a status of said another node has changed and predicting statuses of all other nodes based on said statistically-processed status information of said another node; and routing control means for receiving communication process information from said process information generating means, status information on adjoining nodes from said adjoining-node status collecting means and prediction information predictive of said statuses of said other nodes from said prediction information generating means and selecting a communications path which minimizes a load, based on said communication process information and said prediction information.

41. A routing apparatus for controlling communication paths via a plurality of nodes in a communication network, comprising:

process information generating means for generating communication process information necessary for a communication process in response to a link request from a user;

adjoining-node data storing means for storing data of neighbor nodes located within a predetermined neighbor range around said node;

adjoining-node status collecting means for collecting status information on said neighbor nodes;

status predicting means for receiving statistically-processed status information from another node when a status of said another node/has changed and predicting statuses of all other nodes based on statistically-processed said status information of said another node; and routing control means for receiving communication process information from said process information generating means, status information on said neighbor nodes from said adjoining-node status collecting means and prediction information predictive of said statuses of said other nodes from said prediction information generating means and selecting a communications path which minimizes a load, based on said communication process information and said prediction information.

* * * * *